United States Patent [19]

Mabuchi

[11] Patent Number: 5,036,399
[45] Date of Patent: Jul. 30, 1991

[54] PHASE CONTROLLED CAMERA SYSTEM HAVING DETACHABLE LENS

[75] Inventor: Toshiaki Mabuchi, Tokyo, Japan

[73] Assignee: Canon Kabushiki Kaisha, Tokyo, Japan

[21] Appl. No.: 399,166

[22] Filed: Aug. 28, 1989

[30] Foreign Application Priority Data

Aug. 31, 1988 [JP] Japan .................................. 63-216933

[51] Int. Cl.⁵ ..................... G02B 13/16; H04N 5/225; H04N 5/30; G03B 17/00
[52] U.S. Cl. .................................. 358/225; 358/209; 358/909; 354/286; 354/402
[58] Field of Search ....................... 358/225, 227, 209; 354/195.1, 195.12, 286, 400, 402

[56] References Cited

U.S. PATENT DOCUMENTS 4,171,529 10/1979 Silberberg et al. ................. 358/225
4,320,417 3/1982 Hanma et al. ....................... 358/225
4,790,649 12/1988 Harada et al. ...................... 354/286
4,872,058 10/1989 Baba et al. .......................... 354/402

Primary Examiner—James J. Groody
Assistant Examiner—Wendy R. Greening
Attorney, Agent, or Firm—Robin, Blecker, Daley & Driscoll

[57] ABSTRACT

A camera system comprising a lens unit and a camera unit detachably attached to each other, the camera system having a control circuit for controlling the operation of the lens unit and the operation of the camera unit so as to synchronize a phase of the operation of the lens unit with a phase of operation of the camera unit, and a communication circuit for effecting communication between the camera unit and the lens unit by using a reference signal for obtaining the synchronization between the phase of operation of the lens unit and the phase of operation of the camera unit.

42 Claims, 6 Drawing Sheets

FIG. 1   M: MOUNT SECTION

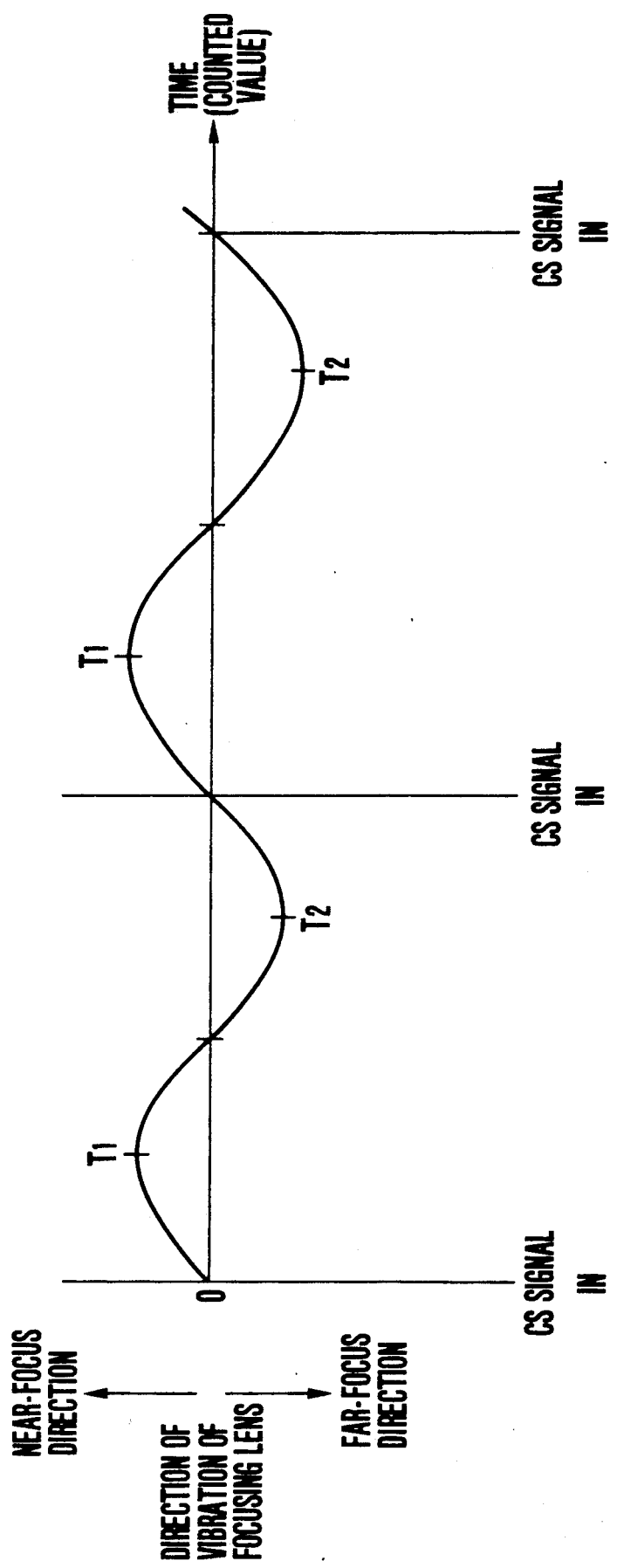

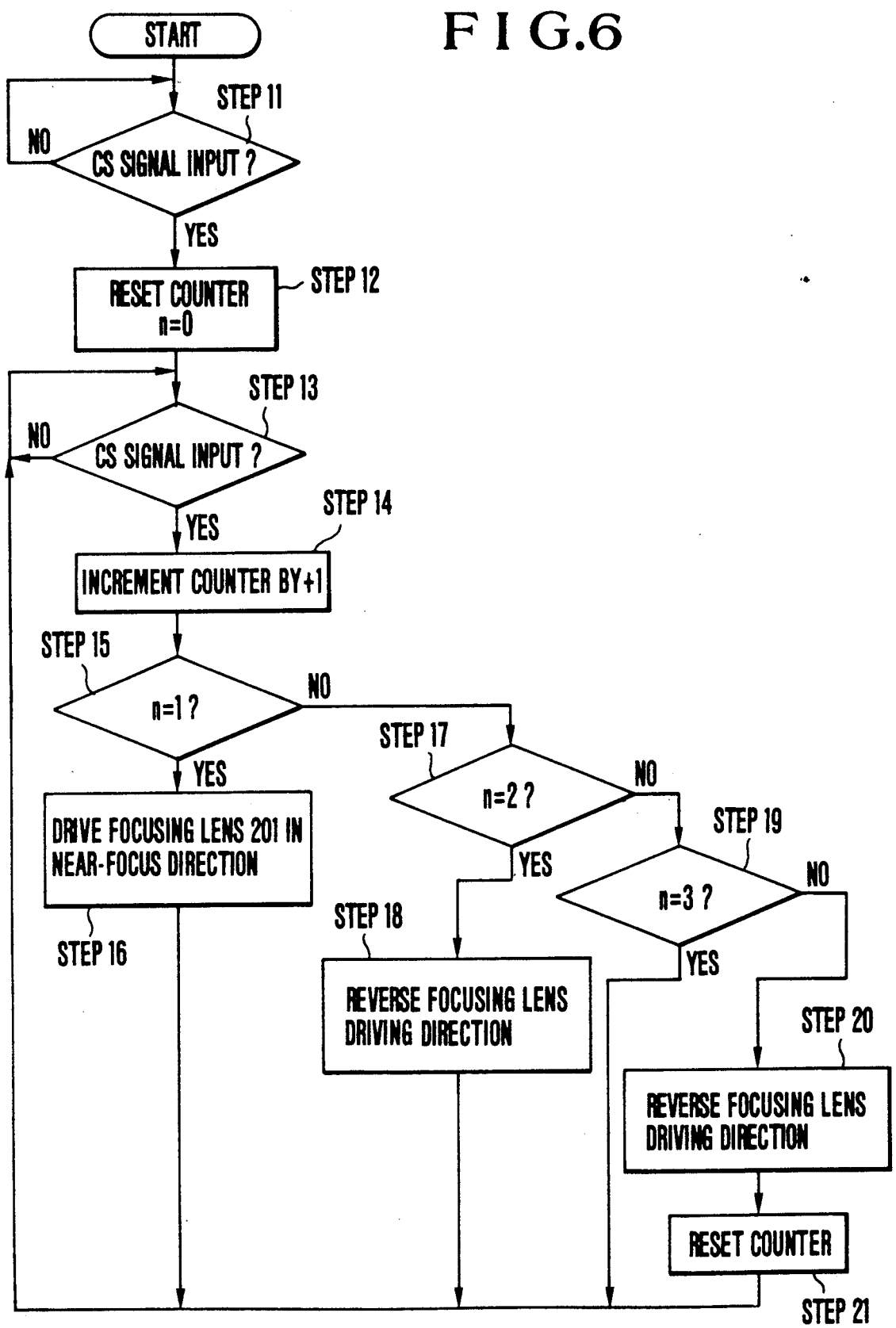

PHASE CONTROLLED CAMERA SYSTEM HAVING DETACHABLE LENS

BACKGROUND OF THE INVENTION

1. Field of the Invention:

This invention relates to a camera having an interchangeable lens.

2. Description of the Related Art:

Recently, various types of video apparatus including video cameras are increasingly diffused. For example, in the field of video cameras, interchangeable lens systems have been proposed which are designed to use interchangeable lenses for the purpose of increasing functions and which are also designed for personal or home use.

Video cameras have many functions including an automatic focusing function.

The principle of the operation of an automatic focusing system will be described below by way of example.

A type of automatic focusing system for video cameras is known in which the definition of an imaged video picture is detected by the magnitude of high-frequency components of a video signal, and the position of the lens is controlled so that the definition (high frequency components) is maximized, thereby automatically controlling focusing of the camera. More specifically, the image signal abruptly changes at an edge of the image of the object so that high-frequency components of the signal increase. If the high-frequency components increase, it is judged that the image becomes closer to the focused state. In relation to this system, a method of determining the direction in which a focus motor is moved if the lens is deviated from the focusing position to a non-focusing position is known in which a piezoelectric element is attached to a lens or an imaging part and is vibrated finely to effect focus modulation, and judgment is made to determine whether the phase of this vibration and the phase of a change in the high-frequency components of the video signal coincide with each other (near-focus) or opposite to each other (far-focus), thereby determining the focus lens driving direction. (This method is called a modulation method.)

In a case where an interchangeable lens system is applied to such a video camera, it is necessary to consider functions provided in a lens unit and processes relating to these functions as well as functions provided in a camera unit and processes relating to these functions, in particular, timing control in order to achieve overall functions of the camera equivalent to those of the conventional camera including the automatic focusing function.

However, in a case where an interchangeable lens system is designed based on the existing video camera systems, there is a need for a process of making the lens unit and the camera unit operate while maintaining a particular phase/timing relationship therebetween. For example, it is necessary for the automatic focusing means to detect a change in a signal representing the degree of focusing in phase with small vibration of the focusing lens of the lens unit. Where lenses which are simply detachable are adopted, there is a possibility of failure to perform such a process with accuracy.

To solve this problem, a method may be adopted which provides, in the lens unit or the camera unit, an automatic focusing system in a complete form whose functions are distributed to only one of the lens unit and the camera unit, e.g., an active system in which reflection of a projection light such as infrared is received by a light receiving element and focusing is performed by utilizing triangulation or a TTL system in which incident light introduced through the lens is received by a special sensor and focusing is performed in the same manner. However, if such a system is adopted, the design for interchangeable lenses is considerably limited and substantial part of the constructions and the control procedures of the lens unit and the camera unit cannot be fully utilized, resulting in failure to utilize the advantages of lens changing.

Also, signal lines may be provided for the number of categories of data necessary for realization of the functions of the lens unit as well as the functions of the camera unit. However, the number of common signal connections is thereby increased. It is difficult to achieve the desired functions if the connection signal system has already been determined and if the increase in the number of signals is limited.

SUMMARY OF THE INVENTION

In view of these problems, an object of the present invention is to provide a camera system using interchangeable lenses in which control operations of the lens unit and the camera unit relating to each other can be smoothly controlled by communication between the lens unit and the camera unit.

Another object of the present invention is to provide a camera system in which the operation of outputting a control instruction from the camera unit and the operation of controlling the driving system of the lens unit can be performed by correct timing without any malfunction.

A still further object of the present invention is to provide a camera system in which control operations of the lens unit and the camera unit relating to each other can be performed with accuracy with a particular phase relationship maintained therebetween.

In view of these circumstances, the present invention provides in one of its aspects a camera having a lens unit and a camera unit detachably attached to each other, the camera including means for controlling a process conducted by the lens unit and a process relating to the process of the lens unit and conducted by the camera unit while maintaining a predetermined phase relationship therebetween, and means for effecting communication between the camera unit and the lens unit by using a reference signal for obtaining the predetermined phase relationship.

This arrangement ensures that control operations for functions of the lens unit and control operations for functions of the camera unit which are to be conducted while maintaining a certain phase relationship therebetween can be optimized by using a reference signal for setting timing alone without providing transmission lines for a number of control signals.

A further object of the present invention is to provide a camera using interchangeable lenses which uses an accurate and stable control signal for controlling the lens unit obtained by calculation of data supplied by communication between the lens unit and the camera unit and which can thereby control the lens unit with accuracy.

The present invention therefore provides in another of its aspects a camera system having driving means for driving the lens unit, calculation means for calculating and outputting a control signal for driving and controlling the lens unit by taking in information based on light introduced through the lens unit, and communication means for effecting communication between the lens unit and the camera unit by using a reference signal for establishing a predetermined relationship between the timing of taking in the information for calculation and the timing of driving of the driving means.

A still further object of the present invention is to provide a camera using interchangeable lenses in which processes which are to be conducted in the lens unit and the camera unit while maintaining a particular phase relationship therebetween can be conducted positively by performing communication using a common timing signal alone.

A still further object of the present invention is to provide a camera in which functions and processes which are ordinarily distributed between the lens unit and the camera unit are suitably grouped and assigned to the lens unit or the camera unit while avoiding any reduction in the degree of lens change freedom or any increase in the number of data communication signal lines, and which is capable of readily establishing a particular relationship between the phases of processing in the lens unit and the camera unit.

A still further object of the present invention is to provide a camera based on an interchangeable lens system in which burdens on the lens unit and the camera unit are reduced by suitably assigning control functions, and the number of electrical connections between the lens unit and the camera unit is reduced, thereby facilitating interchangeable lens system design while enabling an improvement in reliability.

Other objects and features of the present invention will become clear upon reading the following description taken in conjunction of the accompanying drawings.

BRIEF DESCRIPTION OF THE DRAWINGS

FIG. 5 is a diagram of the optical path modulation operation of the focusing lens based on vibration; and FIG. 6 is a flow chart of another example of the optical path modulation operation of the lens microcomputer.

DETAILED DESCRIPTION OF THE PREFERRED EMBODIMENTS

A camera with an interchangeable lens in accordance with the present invention will be described below with reference to the accompanying drawings.

Figure 1:
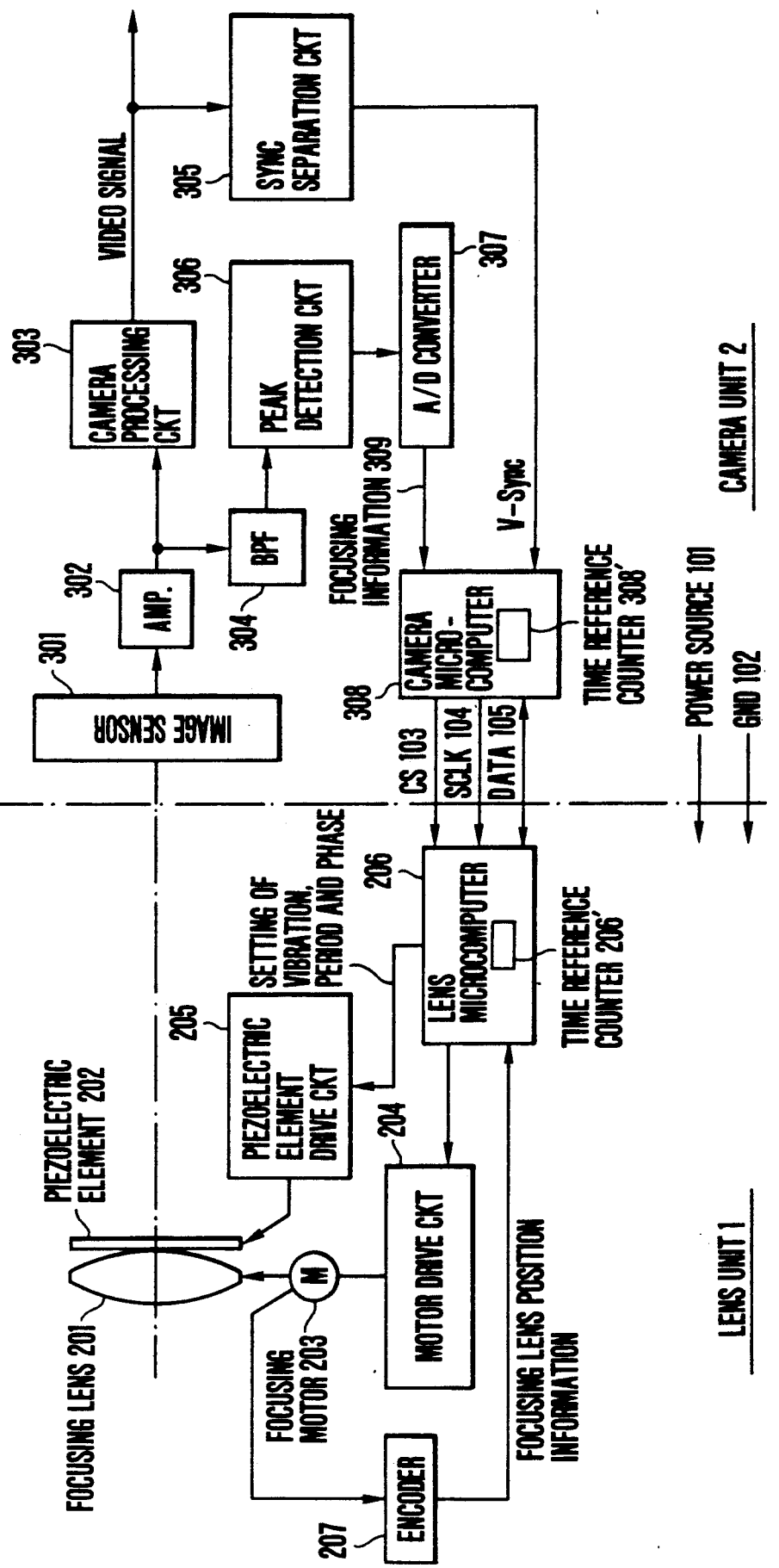
FIG. 1 is a block diagram of a camera with an interchangeable lens which represents an embodiment of the present invention.

Referring to FIG. 1, an arrangement of a video camera to which the present invention is applied is illustrated.

As shown in FIG. 1, the camera has a lens unit 1 and a camera unit 2 which can be detached from each other at a mount section M indicated by the dot-dash line.

The lens unit 1 and the camera unit 2 are constructed in such a manner that, when they are combined, the optical axis of the lens of the lens unit 1 and the optical axis of an imaging device coincide with each other and, at the same time, electrical connections are established in fine lines: a power source line 101, a ground (GND) line 102, a chip selection signal (hereinafter referred to as CS) line 103, a serial clock signal (hereinafter referred to as SCLK) line 104, and a serial data signal (hereinafter referred to as DATA) line 105, thereby enabling communication using various categories of information.

A focusing lens 201 is used for focusing by being moved in the direction of the optical axis. A piezoelectric element 202 is attached to the focusing lens 201 to effect focus modulation. A focusing motor 203 is used to move the focusing lens 201 and is connected to a drive circuit 204. Another drive circuit 205 is provided which is used to drive the piezoelectric element 202.

A microcomputer (hereinafter referred to as "lens microcomputer") 206 controls the overall operation of the lens unit including the operations of the motor driving circuit 204, the piezoelectric element 202 and the drive circuit 205. The lens microcomputer 206 receives a motor driving signal from the camera unit based on the CS signal on the line 103, SCLK signal on the line 104 and DATA signal on the line 105, and instructs the motor driving circuit 204. The lens microcomputer 206 may conduct not only a process of automatic focusing but also a process of zooming, a process or iris control and so on at the same time. Processes other than the automatic focusing process are omitted for simplification of explanation. An encoder 207 is provided to detect the moving position of the focusing lens 201.

An image sensor 301 such as a CCD (charge coupled device) is provided in the camera unit. An amplifier circuit 302 amplifies an electric signal obtained from the image sensor 301 to a predetermined level. A processing circuit 303 receives a video signal output from the amplifier circuit 302, processes this signal in a predetermined manner and outputs the processed signal as a standard TV signal (video signal). A sync separation circuit 305 separates a vertical synchronizing signal (hereinafter referred to as V-sync signal) from the video signal. The V-sync signal is supplied to a later-mentioned microcomputer 308 provided in the camera unit (hereinafter referred to as "camera computer") for control of the operation of this unit.

A band-pass filter 304 is used to extract predetermined high-frequency components necessary for detecting the degree of focusing from the video signal output from the amplifier circuit 302. High-frequency components output from the band-pass filter 304 contain frequency components of focus modulation based on optical path modulation effected by finely vibrating the focusing lens 201 in the direction of the optical axis by means of the piezoelectric element 202.

A peak detection circuit 306 examines a signal which has passed through the band-pass filter 304 to detect a peak value of the signal. The peak detection circuit 306 samples and holds the high-frequency component which has passed through the band-pass filter 304 with a one-field period and outputs the peak level. An A/D converter 307 converts the output from the peak detection circuit 306 from an analog form to a digital form and supplies the converted signal to the camera microcomputer 308 as focusing information 309.

The camera microcomputer 308 uses focusing information 309 to judge the state of focusing, calculates the direction and extent of movement of the focusing motor, and effects communication with the lens microcomputer 206 by using the data signal line 105 for serial data. The camera microcomputer 308 can conduct not only a process of focusing but also a process of zooming, a process of iris control and so on at the same time. However, processes other than the focusing process are omitted for simplification of explanation.

For communication between the camera unit and the lens unit, the extent and direction of driving of the focusing motor 203, for example, are sent from the camera unit to the lens unit, and the position of the focusing lens or the focusing lens driving motor detected by the encoder 207, the extent of actual driving and so on are sent from the lens unit to the camera unit. This communication is performed periodically. Preferably, for operations based on processing of the video signal, the period of the repetition of communication is in synchronization with V-sync signal of the image. That is, the picture frame changes with a field period, and detection and control for automatic focusing are also performed with this field period. The camera microcomputer 308 is therefore supplied with V-sync signal output from the sync separation circuit 305.

Figure 2:
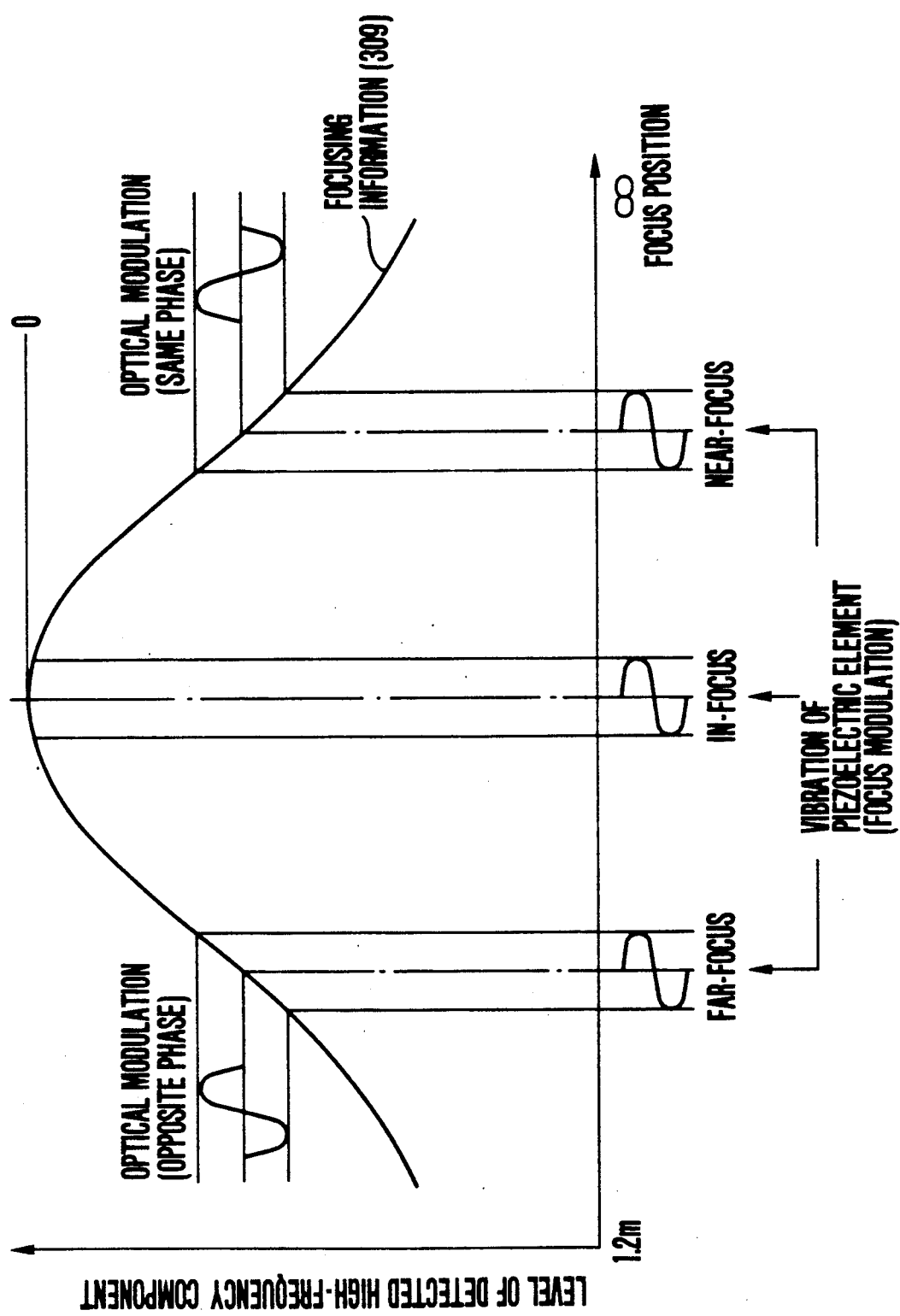
FIG. 2 is a diagram of the operation of an example of the automatic focusing system of the embodiment of the present invention.

An image of the object is formed on the imaging plane of the image sensor 301 by the lens 201 and is converted into an electric signal (video signal) by the image sensor 301, and the electric signal is supplied via the amplifier circuit 302 to the camera processing circuit 303 and to the band-pass filter 304. The band-pass filter 304 allows only high-frequency components of the electric signal (video signal) to pass through it. As a result of processing in the peak detector 306 and the A/D converter 307, the peak value of the filtered signal is supplied as focusing information 309 to the camera microcomputer 308. The camera microcomputer 308 compares the present focusing information with the focusing information obtained one sampling period (one field) before to determine whether or not the lens is focused, and supplies data (extent and direction of operation) for driving the focusing motor 203 to the lens microcomputer 206 via the serial data lines 103 to 105. The lens microcomputer 206 issues an instruction to the motor driving circuit 204 on the basis of the data supplied from the camera microcomputer 308, and the focusing motor 203 is thereby operated to move the focusing lens 201. In this event, a modulation method of finely vibrating the focusing lens 201 by means of the piezoelectric element 202 is used in order to speedily determine the direction of driving of the focusing motor 203. FIG. 2 shows the principle of operation in accordance with the modulation method using a piezoelectric element. If the piezoelectric element is moved with a very small amplitude, the video signal is modulated with the frequency of this vibration, and the level of the video signal vibrates with a very small amplitude at far-focus, in-focus and near-focus positions. It is thereby possible to determine near-focus or far-focus on the basis of whether the phase of vibration of the piezoelectric element and the phase of the focus modulation signal equal to or opposite to each other. In the case of an ordinary camera integral with a lens, the operation of the camera microcomputer 308 (receiving focusing information) and the lens microcomputer 206 (making the piezoelectric element vibrate) is performed by one microcomputer, and the relationship between the phases of corresponding signals is simple. In the case of an interchangeable system such as that shown in FIG. 1 having a lens unit and a camera body detachably attached to each other, if the lens driving system and the detection system are separately provided in the lens unit and the camera unit, respectively, it is necessary to obtain focusing information as shown in FIG. 2 by driving, in the lens unit, the piezoelectric element 202 with a predetermined phase to vibrate the focusing lens 201 and detecting, in the camera unit, changes in high-frequency components of the video signal on the basis of the period of vibration of the focusing lens.

That is, the modulation method makes it possible not only to discriminate in-focus or out-of-focus states but also to obtain, in the case of an out-of-focus state, information on the direction of defocusing, i.e., near-focus or far-focus. This method is therefore effective but it requires the camera microcomputer 308 to always monitor the phase of the focusing lens 201 because the state of focusing is determined by observing changes in the peak value of high-frequency components of the video signal output from the image sensor 301 with respect to the phase of vibration of the focusing lens (focus modulation phase) when the focusing lens 201 is moved to a near-focus position, to a far-focus position and to the center of movement.

However, if the lens and the camera body are provided as separated units, the relationship between the phase of vibration of the focusing lens in the lens unit and the phase of detection on the side of the camera body cannot by determined and the accuracy of focusing information is low, resulting in failure to effect focus determination as well as failure to perform various kinds of control efficiently. The present invention solves this problem as described below. That is, since information on near-focus and far-focus is obtained from changes in the level of high-frequency components when the focusing lens is moved along the optical axis to and from, the accuracy of detection can be maximized by sampling the level of the high-frequency components at, for example, the position corresponding to a crest of vibration, i.e., the position at which the change in the level is maximum.

In accordance with the present invention, a means for supplying a timing signal from the camera unit to the lens unit is used in order to synchronize the phase of vibration of the piezoelectric element 202 on the lens side and the phase of detection of changes in high-frequency components of the video signal based on the vibration of the piezoelectric element 202.

It is thereby possible to perform focus modulation in the lens unit while performing detection of the level of high-frequency components in the camera unit correctly according to the timing based on the phase of the focus modulation. The lens unit and the camera unit can be controlled independently while maintaining a predetermined phase relationship therebetween.

Figure 3:
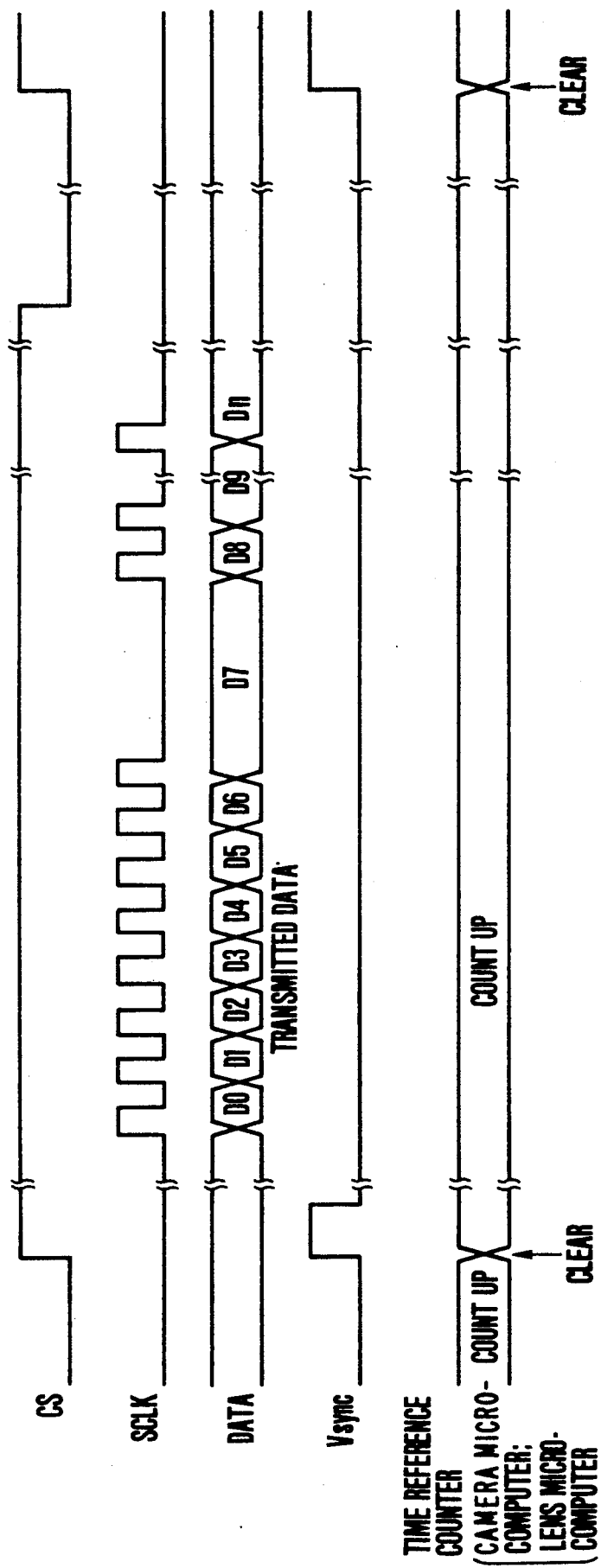
FIG. 3 is a timing chart of the control operation of the camera system in accordance with the present invention.

FIG. 3 shows a timing chart illustrating the control timing of the lens unit and the camera unit.

The camera microcomputer 308 outputs CS signal in synchronization with V-sync signal supplied from the sync separation circuit 305 and simultaneously initializes (clears) a time reference counter 308' provided in the camera microcomputer 308. Count-up of this counter is continued until V-sync signal rises next. CS signal is output until the communication between the camera unit and the lens unit is completed. The lens microcomputer 206 prepares for receiving of communication data in response to the input of CS signal and simultaneously initializes (clears) an internal time reference counter 206'. Count-up of this counter is continued until CS signal or, substantially, V-sync signal rises next.

The lens microcomputer 206 controls the drive timing of the piezoelectric element 202, i.e., the period of vibration thereof on the basis of the counted value of the internal time reference counter 206'. Since the counted value corresponds to time, it is possible to set, from the start of counting of the counter, the period and phase of vibration of the lens with accuracy by controlling the direction of driving of the piezoelectric element 202, i.e., the direction of driving of focusing lens 201 according to the counted value, that is, on the basis of the time when a predetermined counted value is obtained.

The camera microcomputer 308 determines the direction in which the piezoelectric element 202 is swung at the present time according to the counted value of the internal reference counter 308', that is, whether the focusing lens 201 is swung in the near-focus direction or far-focus direction, and examines the meaning of the focusing information 309 at the corresponding time (that is, whether or not the lens is focused and, in the case of non-focus, whether the lens is in near-focus or far-focus), thereby determining the direction of driving of the focusing lens driving motor 203.

The time reference counter 308' of the camera microcomputer 308 starts counting when V-sync signal rises, and the time reference counter 206' of the lens microcomputer 206 starts counting in synchronization with the rise of CS signal output from the camera unit by the timing corresponding to the rise of V-sync signal. The time reference counters of the lens unit and the camera unit therefore perform counting by the same timing. (Errors due to transmission are ignored.)

In consequence, even though the counted value on the lens side or the phase of the focusing lens of the lens unit is not transmitted to the camera unit, there is no possibility of error in synchronization between the lens unit and the camera unit, and it is possible for the lens unit and the camera unit to control vibration and to detect the phase of vibration, respectively.

The camera unit is therefore possible even for a system based on various combinations of lens units and a camera unit detachably attached to each other to perform automatic focusing by operating the lens unit and the camera unit while constantly maintaining the desired relationship between the timing of control and the timing of detection phase.

It is therefore possible for the camera unit to detect the phase of driving of the focusing lens 201 with accuracy even though information on changes in the position of the focusing lens 201 in the lens unit caused by the piezoelectric element 202 is not directly transmitted to and received by the camera microcomputer 308.

It is sufficient to use a timing signal alone for communication between the lens unit and the camera unit, which is advantageous in terms of improvement in compatibility also.

The control of vibration of the focusing lens 201 using the lens microcomputer will now be described below with reference to FIGS. 4 and 5.

Figure 4:
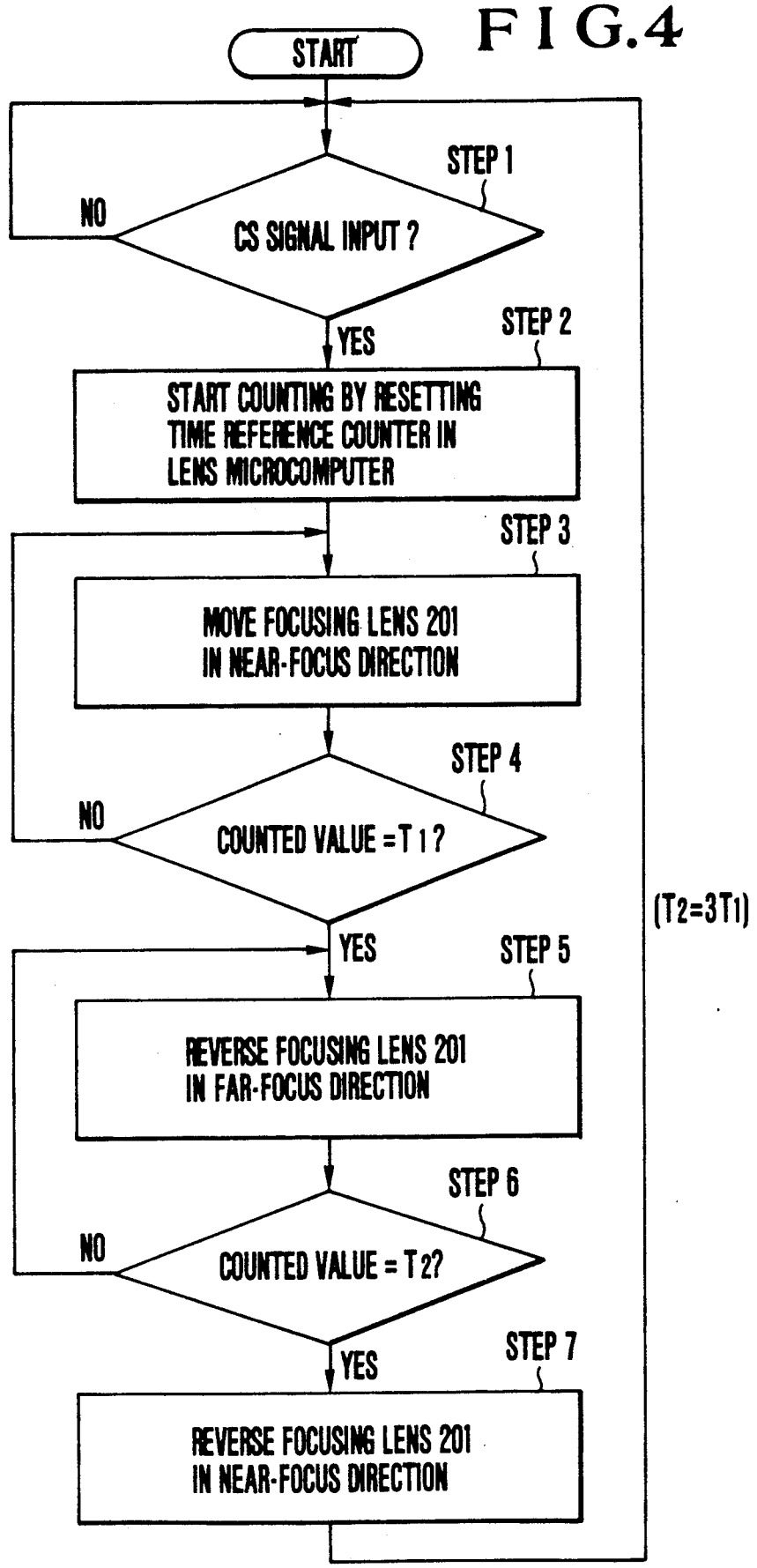
FIG. 4 is a flow chart of the optical path modulation operation of the lens microcomputer.

FIG. 4 is a flow chart of the modulating operation of the focusing lens 201 based on the input of CS signal, and FIG. 5 is a diagram of the movement of the focusing lens 201.

Referring to FIG. 4, after starting the flow, CS signal is input in step 1, and the lens microcomputer resets the internal time reference counter to newly start counting (step 2).

Subsequently, the focusing lens is driven in the near-focus direction from the present position until the counted value of the counter becomes equal to $T_1$ (steps 3, 4), is moved in the opposite direction when the counted value becomes equal to $T_1$ (step 5), is driven in the far-focus direction until the counted value becomes equal to $T_2$ (step 6), and is moved in the near-focus direction again (step 7) when the counted value becomes equal to $T_2$. The process then returns to step 1, thereafter repeating this operation.

The focusing lens is thereby periodically vibrated in the direction of near-focus or far-focus with increase in the counted value, i.e., with elapse of time, as shown in FIG. 5, thereby effecting optical path modulation. The period thereof is set in synchronization with CS signal, i.e., V-sync signal.

In the example shown in FIG. 4, the period of vibration of the focusing lens 201 coincides with the period of CS signal but it may be set to a longer period.

FIG. 6 shows a flow chart of example of vibration control of a longer period. That is, the focusing lens is vibrated with a period four times longer than that of CS signal.

In this case, the reference counter in the lens microcomputer may count CS signal.

After starting the flow, CS signal is input in step 11, the reference counter in the microcomputer is reset at the first time only to set the counted value to n=0 (step 12), and the subsequent rise of CS signal is awaited in step 13. Each time CS signal counter is incremented by 1 (step 14). In step 16, the focusing lens 201 is driven in the near-focus direction if n=1 in step 15. Similarly, if n=2, the focusing lens driving direction is reversed and set to the far-focus direction (steps 17, 18), and it is maintained in the far-focus direction if n=3 (step 19) or is reversed and set to the near-focus direction and the counter is reset if n=4 (steps 20, 21).

The direction of driving of the focusing lens is controlled in this manner, and the focusing lens is vibrated in the direction of the optical axis back and forth with the period corresponding to four periods of CS signal, thereby effecting optical path modulation.

Thus, the period of vibration of the focusing lens is determined in synchronization with CS signal, and the vibration is synchronized with the operation of the camera microcomputer, thereby effecting supply of information and calculation in phase with the lens vibration.

The above-described system prescribes the start position of CS signal alone and does not prescribe the actual communication process (timing of output of SCLK and DATA) or have a bad influence upon the operation of communication.

In the above-described embodiment, a pulse motor or the like may be used as the focusing motor in such a manner that the motor is finely swung back and forth during the movement of the focusing lens, thereby eliminating the need for the piezoelectric element 202. In this case, it is also necessary to maintain the phase of swinging of the motor 203 on the basis of the method of the present invention.

The present invention is described above with respect to a clock synchronization system for communication. In the case of asynchronous communication (such as UART), however, control operations of the lens unit and the camera unit can be performed in synchronization with each other by means of synchronizing the start bit with V-sync signal.

The above-described embodiment exemplifies a case where lens driving (modulation period, phase) on the lens side and detection of the period and phase of lens movement on the camera body side are performed in synchronization with each other with respect to different positions of the lens by communication between the lens unit and the camera unit. However, the present invention is not limited to automatic focusing; it can be applied to any other systems so long as they are designed to separately control the lens unit and the camera unit in a real time manner by the timing for synchronization therebetween or by maintaining the desired phase relationship.

In the above-described camera with an interchangeable lens in accordance with the present invention, processes which are to be conducted in the lens unit and the camera unit while maintaining a particular phase relationship therebetween can be conducted positively by performing communication using a common timing signal alone. Functions and processes which are ordinarily distributed between the lens unit and the camera unit can be conducted at one side, namely lens side or camera side, without losing freedom in changing lens or causing any increase in the number of data communication signal lines. A particular relationship between the phases of processing in the lens unit and the camera unit can therefore be obtained easily. That is, burdens on the lens unit and the camera unit are reduced by suitably assigning control functions, and the number of electrical connections between the lens unit and the camera unit is reduced, thereby facilitating interchangeable lens system design while enabling an improvement in reliability.

What is claimed is:

1. A camera system having a lens unit and a camera unit to which said lens unit can be detachably attached, said camera system comprising:
    (A) control means for controlling an operation of said lens unit and an operation of said camera unit to control said lens unit, so as to synchronize a phase of the operation of said lens unit with a phase of the operation of said camera unit; and
    (B) communication means for effecting communication between said camera unit and said lens unit by using a reference signal for obtaining phase synchronization between the operation of said lens unit and the operation of said camera unit.

2. A camera system according to claim 1, wherein said lens unit includes driving means for driving a part of an optical system provided in said lens unit, and said operation of lens unit is an operation of periodically changing the length of the optical path by making said driving mean vibrate said optical system with a predetermined frequency to modulate incident light which has passed through said optical system by optical path modulation.

3. A camera system according to claim 2, wherein said camera unit includes imaging means for converting an image of an object formed on an imaging plane by said lens unit into an electric imaging signal and outputting the signal, and said operation of said camera unit is an operation of determining the state of focusing of said lens unit from the imaging signal output from said imaging means and calculating a focus control signal for focusing said lens unit according to the state of focusing.

4. A camera system according to claim 3, wherein said calculation is effected by a microcomputer provided in said camera unit, and said microcomputer detects the state of focusing of said lens unit by taking in signal components modulated by said optical path modulation from the imaging signal, and calculates the focus control signal.

5. A camera system according to claim 4, wherein said modulating operation is controlled by a microcomputer provided in said lens unit.

6. A camera system according to claim 5, wherein said communication means transmits the focus control signal calculated by said calculation to said lens unit.

7. A camera system according to claim 6, wherein said communication means transmits to said lens unit a synchronizing signal for establishing a certain phase relationship between the timing of taking data in said microcomputer of said camera unit or of the calculation and the timing of vibration effected by said driving means.

8. A camera system according to claim 7, wherein said synchronizing signal is a chip selection signal supplied from said microcomputer of said camera unit to said microcomputer of said lens unit.

9. A camera system according to claim 8, wherein said communication means transmits control information including the focus control signal to said lens unit subsequently to transmission of the chip selection signal.

10. A camera system according to claim 8, wherein said chip selection signal is in synchronization with a vertical synchronizing signal.

11. A camera system according to claim 8, wherein said microcomputer of said lens unit has a counter for controlling the phase of driving of said optical system effected by said driving means, and said counter is reset in synchronization with the chip selection signal to perform phase control.

12. A camera unit to which a lens unit is detachably attached, said camera unit comprising:
    (A) driving means for driving an optical system provided in said lens unit;
    (B) calculation means for calculating a control signal for driving and controlling said lens unit by taking in information based on light introduced through said lens unit; and
    (C) communication means for effecting communication between said lens unit and said camera unit by using a reference signal for establishing a predetermined phase relationship between the timing of taking in said information for calculation and the timing of driving of said driving means.

13. A camera unit according to claim 12, further comprising imaging means for converting light imaged on an imaging plane by said lens unit into an electric imaging signal and outputting this signal.

14. A camera unit according to claim 13, wherein said optical system constitutes focusing means.

15. A camera unit according to claim 14, wherein said driving means includes modulation means for modulating incident light passed through said optical system by optical path modulation based on periodically changing the length of said optical path so that the imaging signal output from said imaging means is modulated with the period of the optical path modulation.

16. A camera unit according to claim 15, wherein said calculation means determines the state of focusing of said lens unit from the imaging signal output from said imaging means and calculates a focus control signal according to the state of focusing.

17. A camera unit according to claim 16, wherein said communication means transmits the focus control signal calculated by said calculation means to said lens unit.

18. A camera unit according to claim 17, wherein said driving means controls the imaging position of said optical system on the basis of the focus control signal transmitted by said communication means so as to adjust the imaging position to the in-focus position.

19. A camera unit according to claim 15, wherein said modulation means vibrates said optical system in the direction of the optical axis back and forth about said imaging position.

20. A camera unit according to claim 12, wherein said communication means transmits to said lens unit a synchronizing signal for establishing a certain phase relationship between the timing of taking data in said calculation means or of the calculation and the timing of vibration effected by said modulation means.

21. A camera unit according to claim 20, wherein said calculation means is constituted by a microcomputer.

22. A camera unit according to claim 21, wherein said lens unit has a microcomputer for controlling driving of said optical system on the basis of the focus control signal and the synchronizing signal.

23. A camera unit according to claim 22, wherein said synchronizing signal is a chip selection signal supplied from said microcomputer of said camera unit to said microcomputer of said lens unit.

24. A camera unit according to claim 23, wherein said communication means transmits control information including the focus control signal to said lens unit subsequently to transmission of the chip selection signal.

25. A camera unit according to claim 23, wherein said chip selection signal is in synchronization with a vertical synchronizing signal.

26. A camera unit according to claim 24, wherein said microcomputer of said lens unit has a counter for controlling the phase of driving of said optical system effected by said modulation means, and said counter is reset in synchronization with the chip selection signal to perform phase control.

27. A camera having a lens unit and a camera unit, comprising:
(A) driving means for changing the imaging position of said lens unit;
(B) imaging means for converting an image of an object formed on an imaging plane by said lens unit into an electric imaging signal and outputting the signal;
(C) calculation means for detecting the state of focusing of said lens unit on the basis of the imaging signal and outputting a focus control signal for moving the imaging position to the in-focus position; and
(D) communication means for transmitting a reference signal serving to provide a reference for controlling the timing of the operations of said driving means and said calculation means so as to establish a predetermined phase relationship therebetween.

28. A camera according to claim 27, wherein said driving means includes modulation means for modulating incident light having passed through an optical system of said lens unit by changing the length of an optical path of said optical system with a period so that the imaging signal output from said imaging means is modulated with said period.

29. A camera according to claim 28, wherein said calculation means determines the state of focusing of said lens unit from the imaging signal output from said imaging means and calculates a focus control signal according to the state of focusing.

30. A camera according to claim 29, wherein said communication means transmits the focus control signal calculated by said calculation means to said lens unit.

31. A camera according to claim 30, wherein said driving means moves the imaging position of said optical system corresponding to the center of vibration effected by said modulation means of said optical system to the in-focus position.

32. A camera according to claim 31, wherein said communication means transmits to said lens unit a synchronizing signal for establishing a certain phase relationship between the timing of taking data in said calculation means or of the calculation and the timing of vibration effected by said modulation means.

33. A camera according to claim 32, said calculation means is constituted by a microcomputer.

34. A camera according to claim 33, wherein said lens unit has a microcomputer for controlling driving of said optical system on the basis of the focus control signal and the synchronizing signal.

35. A camera according to claim 22, wherein said synchronizing signal is a chip selection signal, and said communication means transmits control information including the focus control signal to said lens unit subsequently to transmission of the chip selection signal.

36. A camera according to claim 35, wherein said chip selection signal is in synchronization with a vertical synchronizing signal.

37. A camera according to claim 36, wherein said microcomputer of said lens unit has a counter for controlling the phase of driving of said optical system effected by said modulation means, and said counter is reset in synchronization with the chip selection signal to perform phase control.

38. A camera system having a lens unit and a camera unit to which said lens unit can be detachably attached, said camera system comprising:
(A) image pick-up means disposed in said camera unit, for photoelectrically converting an image focused on an image sensing plane by said lens unit into an image signal and for outputting the image signal;
(B) control means disposed in said camera unit, for detecting a photographing state from said image signal and for producing, by a computation a control information for controlling said lens unit;
(C) transmitting means for transmitting the control information produced by said control means to said lens unit in synchronized relation with a synchronizing signal in said image signal;
(D) control means disposed in the lens unit, for adjusting a state of said lens unit on the basis of the control information transmitted by said transmitting means; and
(E) phase control means for synchronizing the phase of operation of the control means in the camera unit with the phase of operation of the control means in said lens unit.

39. A camera system according to claim 38, wherein said lens unit includes driving means for driving a part of an optical system provided in said lens unit, and said operation of lens unit is an operation of periodically changing the length of the optical path by making said driving means vibrate said optical system with a predetermined frequency to modulate incident light which has passed through said optical system by optical path modulation.

40. A camera system according to claim 39, wherein said computation is effected by a microcomputer provided in said camera unit, and said microcomputer detects a focus state of said lens unit by taking in signal components modulated by said optical path modulation from the imaging signal, and calculates a focus control signal.

41. A camera system according to claim 40, wherein said phase control means includes a reference signal which is transmitted from the camera unit to the lens unit, and the control means in the lens unit produces wobbling of a focusing lens in the lens unit on its optical axis in a phase synchronized with said reference signal.

42. A camera system according to claim 41, wherein said control means in the camera unit is arranged to detect a signal corresponding to the focusing state from among the image signals modulated by the wobbling of the focusing lens and to output a control signal for driving the focusing lens to an in-focus position.

* * * * *